United States Patent
Kim et al.

(10) Patent No.: US 8,810,479 B2
(45) Date of Patent: Aug. 19, 2014

(54) MULTI-PANEL DISPLAY DEVICE CONFIGURED TO ALIGN MULTIPLE FLAT PANEL DISPLAY DEVICES FOR REPRESENTING A SINGLE IMAGE AND METHOD OF DRIVING THE SAME

(75) Inventors: Seong Gyun Kim, Gyeonggi-do (KR); Jun Ho Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 457 days.

(21) Appl. No.: 12/465,292

(22) Filed: May 13, 2009

(65) Prior Publication Data

US 2010/0134384 A1 Jun. 3, 2010

(30) Foreign Application Priority Data

Nov. 28, 2008 (KR) ........................ 10-2008-0119502

(51) Int. Cl.
*G09G 5/00* (2006.01)
*G06F 3/14* (2006.01)

(52) U.S. Cl.
CPC ........ *G06F 3/1446* (2013.01); *G09G 2370/042* (2013.01); *G06F 3/1431* (2013.01); *G09G 2370/025* (2013.01)
USPC .......................................................... 345/1.3

(58) Field of Classification Search
USPC .......................................................... 345/1.3
See application file for complete search history.

(56) References Cited

U.S. PATENT DOCUMENTS

| | | | |
|---|---|---|---|
| 5,050,003 A * | 9/1991 | Horii et al. | 386/230 |
| 5,396,257 A | 3/1995 | Someya et al. | |
| 5,784,035 A * | 7/1998 | Hagiwara et al. | 345/1.3 |
| 7,808,447 B1 * | 10/2010 | Cook | 345/1.3 |
| 7,995,003 B1 * | 8/2011 | Diard et al. | 345/1.3 |
| 2001/0006375 A1* | 7/2001 | Tomooka et al. | 345/4 |
| 2009/0002263 A1* | 1/2009 | Pasetto | 345/1.3 |

FOREIGN PATENT DOCUMENTS

JP     H06-169430     6/1994

* cited by examiner

*Primary Examiner* — Kwang-Su Yang
(74) *Attorney, Agent, or Firm* — Morgan, Lewis & Bockius LLP

(57) ABSTRACT

A multi-panel display device and a method of driving the same, which can simplify a driving circuit for driving multiple flat panel display devices, thereby decreasing the fabrication cost and reducing noise, are disclosed. In the multi-panel display device configured to align the multiple flat panel display devices for representing a single image, the multi-panel display device includes at least one image display unit configured to align the multiple flat panel display devices in an n×m formation (wherein m and n are integers being equal to or different from one another, and wherein m≥1, n≥1), and at least one data converter being configured to correspond to each image display unit, dividing externally inputted video data in accordance with offset information inputted by a user, and converting the size of the divided video data, thereby providing the converted divided video data to each flat panel display device.

5 Claims, 9 Drawing Sheets

MULTI-PANEL DISPLAY DEVICE CONFIGURED TO ALIGN MULTIPLE FLAT PANEL DISPLAY DEVICES FOR REPRESENTING A SINGLE IMAGE AND METHOD OF DRIVING THE SAME

This application claims the benefit of the Korean Patent Application No. 10-2008-119502, filed on Nov. 28, 2008, which is hereby incorporated by reference as if fully set forth herein.

BACKGROUND OF THE INVENTION

1. Field of the Invention

The present invention relates to a multi-panel display device and a method of driving the same that can represent a single image using multiple flat panel display devices, and more particularly, to a multi-panel display device and a method of driving the same that can simplify a driving circuit for driving multiple flat panel display devices, thereby decreasing the fabrication cost and reducing noise.

2. Discussion of the Related Art

In today's information-oriented society, a flat panel display device acts as a medium for delivering visual information. And, with the growing importance of such media, various types of flat panel display devices are being developed. Recently, liquid crystal display (LCD) devices, field emission display (FED) devices, plasma display panel (PDP) devices, and light emitting display (LED) devices have been noted as the most prominent types of flat panel display devices. Among the many display devices, the liquid crystal display device have been extending its scope of application with its characteristics of excellent resolution, color display, and picture quality, thin and light-weight structure, and low power consumption. The liquid crystal display device may adjust light transmissivity of the liquid crystal cells based upon a video signal, thereby displaying the image.

Recently, the liquid crystal display device and many other flat panel display devices have been configured in multiple panel structure, so as to be used as a multi-panel display device for representing a single image. However, the related art multi-panel display device, which represents a single image by using a plurality of flat panel display devices, has been found to be disadvantageous in that the device requires a conversion board, such as a scaler, corresponding to each of the flat panel display devices configured therein. Also, since a transmission length of the video data is extended with respect to the connection length of each display device, noise may occur in the related art multi-panel display device. More specifically, each of the conversion boards configured to match (or be in correspondence with) each display device receives video data from at least one video data distributor, which are connected to in parallel or in series. Subsequently, the received video data are detected to fit the position and size of each display device. Thereafter, each of the detected data is converted to fit the size of each respective display device, thereby being provided to the corresponding display device.

As described above, since the related art multi-panel display device requires an image distributor for distributing video data to each display device used therein, and also a conversion board, such as a scaler, the structure of the driving circuit and the method of driving the display device eventually become complicated. Particularly, since a scaler or a conversion board includes an analog-to-digital (A/D) converter, a frequency converter, a decoding circuit, a digital-to-analog (D/A) converter, a high capacity memory unit, and a scale conversion circuit, problems such as an increase in fabrication cost and a decrease in production efficiency may occur. Additionally, in case of the related art multi-panel display device, which is connected to at least one video data distributor in parallel or in series, thereby being provided with the video data, the transmission length of the video data varies depending upon the size and structural position of the multi-panel display device. Thus, the multi-panel display device may be influenced by the noise that may occur due to the change in transmission length.

SUMMARY OF THE INVENTION

Accordingly, the present invention is directed to a multi-panel display device and a method of driving the same that substantially obviate one or more problems due to limitations and disadvantages of the related art.

An object of the present invention is to provide a multi-panel display device and a method of driving the same that can simplify a driving circuit for driving the multiple flat panel display devices, thereby decreasing the fabrication cost and reducing noise.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a multi-panel display device configured to of multiple flat panel display devices for representing a single image, the multi-panel display device includes at least one image display unit configured to align the multiple flat panel display devices in an n×m formation (wherein m and n are integers being equal to or different from one another, and wherein m≥1,n≥1), and at least one data converter being configured to correspond to each image display unit, dividing externally inputted video data in accordance with offset information inputted by a user, and converting the size of the divided video data, thereby providing the converted divided video data to each flat panel display device.

Herein, each data converter may include an ID set-up unit internally setting up an ID signal based upon the offset information inputted by the user, thereby storing and outputting the set up ID signal, a frequency converter performing expansion-conversion or reduction-conversion on a signal frequency of at least one synchronization signal inputted from an external source, thereby generating a frequency-converted synchronization signal, an image extractor detecting and dividing the video data with respect to the ID signal, thereby generating and outputting a plurality of divided video data, and an image converter expanding or reducing the size of the divided video data using the frequency-converted synchronization signal, thereby providing the size-converted divided video data to each of the flat panel display devices. Each data converter may further include a first memory unit storing and outputting each of the divided video data in units of at least one frame, and a second memory unit storing and outputting each of the expansion-converted or reduction-converted video data in units of at least one frame. Also, each image converter may equally extract pixel unit data of a divided video data, which may be sequentially outputted from the first memory unit, in both horizontal and vertical directions in accordance with the frequency-converted synchronization signal.

The at least one image display unit may be aligned in at least one of 1×2, 2×1, 2×2, and n×m formations (wherein m and n are integers being equal to or different from one another), and, regardless of the alignment formation, each of the data converters, which are formed to be in correspondence with each image display unit, may be connected to one another either in parallel or in series, or in a combination of parallel/serial connection, so as to be simultaneously provided with the video data and the synchronization signals.

Herein, the offset information may correspond to at least one of structural position information of each flat panel display device, size information of the inputted video data, total size information of the multi-panel display device, size information of each individual flat panel display device, and alignment position information of the flat panel display devices.

In another aspect of the present invention, in a method of driving a multi-panel display device configured to alignment the multiple flat panel display devices for representing a single image, the method of driving the multi-panel display device includes aligning at least one image display unit configured to align the multiple flat panel display devices aligned in an n×m formation (wherein m and n are integers being equal to or different from one another, and wherein m≥1,n≥1) configuring at least one data converter so as to be in correspondence with each image display unit, and dividing externally inputted video data in accordance with offset information inputted by a user using the at least one data converter, and converting the size of the divided video data, thereby providing the converted video data to each flat panel display device.

Herein, the converting the size of the divided video data may include internally setting up an ID signal based upon the offset information inputted by the user, thereby storing and outputting the set up ID signal, performing expansion-conversion or reduction-conversion on a signal frequency of at least one synchronization signal inputted from an external source, thereby generating a frequency-converted synchronization signal, detecting and dividing the video data with respect to the ID signal, thereby generating a plurality of divided video data, and expanding or reducing the size of the divided video data using the frequency-converted synchronization signal, thereby providing the size-converted divided video data to each of the flat panel display devices. Furthermore, in the converting the size of the divided video data, at least one memory unit may be used to equally extract pixel unit data of a divided video data in both horizontal and vertical directions in accordance with the frequency-converted synchronization signal, thereby expanding or reducing the size of the divided video data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
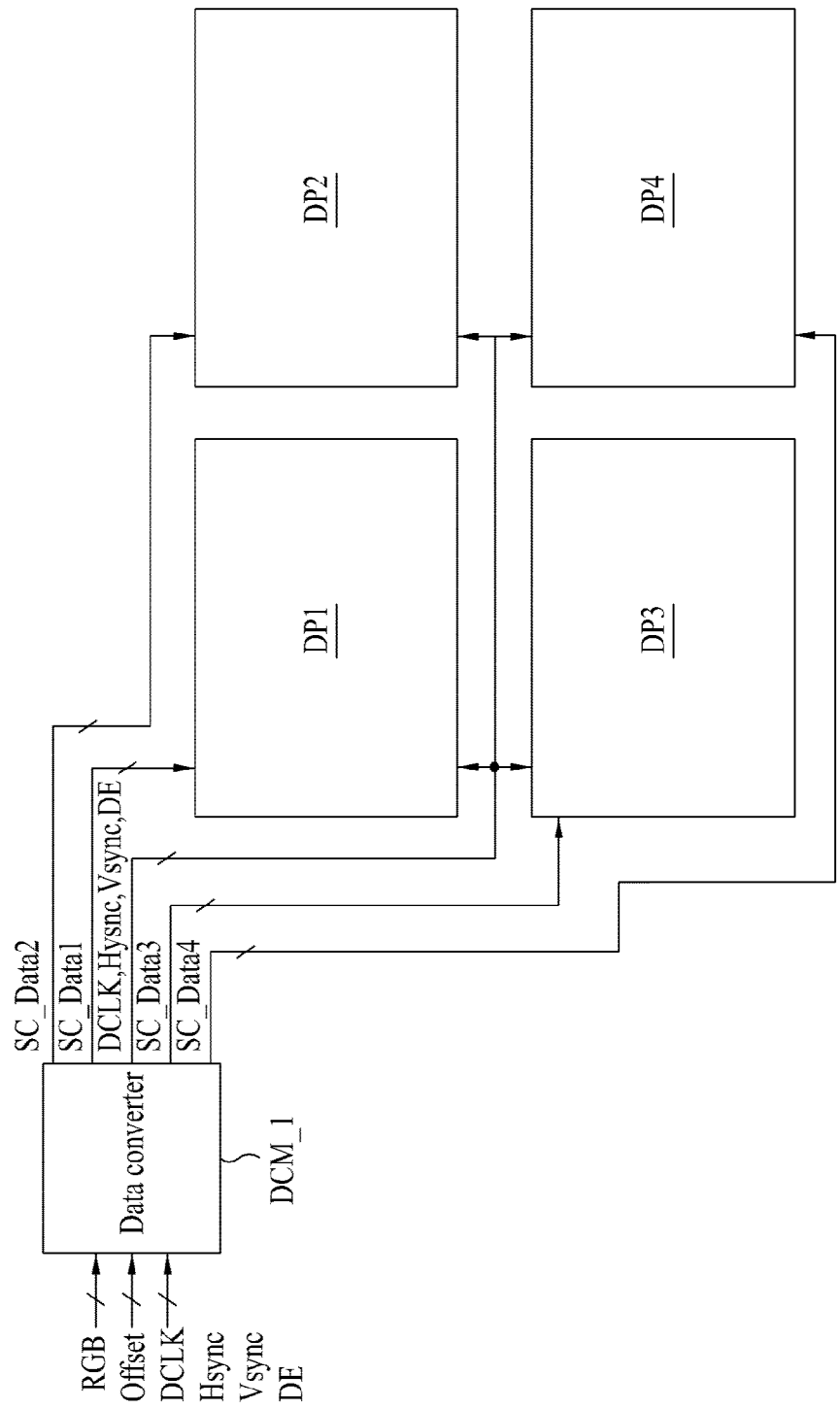
FIG. 1 illustrates a block view showing the structure of a multi-panel display device according to an embodiment of the present invention.

Hereinafter, the multi-panel display device and the method of driving the same will now be described in detail with reference to the accompanying drawings. FIG. 1 illustrates a block view showing the structure of a multi-panel display device according to an embodiment of the present invention. As shown in FIG. 1, the multi-panel display device according to the present invention includes an image display unit and a data converter (DCM_1). More specifically, the image display unit is configured for multiple flat panel display devices (DP1 to DP4), which are aligned in a 2×2 formation or in a larger formation. The data converter (DCM_1) divides externally inputted video data (RGB) based upon offset information inputted by a user, converts the size of the divided video data portions, thereby providing the converted video data portions to each flat panel display device (DP1 to DP4). Thus, the multi-panel display device can represent a single image based upon video data (RGB) and synchronization signals (DCLK, Hsync, Vsync, and DE) received from an external source.

The data converter (DCM_1) stores the offset information inputted by the user and simultaneously provided with the video data (RGB) and the synchronization signals (DCLK, Hsync, Vsync, and DE) from an external source. Then, the data converter (DCM_1) divides video data (RGB) based upon the stored offset information (e.g., the total size of the multi-panel display device, the size of each individual display device (DP1 to DP4), and the alignment position of the display devices (DP1 to DP4)). Additionally, the data converter (DCM_1) expansion-converts or reduction-converts the signal frequency of at least one of the inputted synchronization signals (DCLK, Hsync, Vsync, and DE). Then, the data converter (DCM_1) converts the divided video data (i.e., divided video data portions) using the frequency-converted synchronization signal by horizontally and vertically expanding or reducing the size of the divided video data. Thereafter, the converted video data portions are provided to the respective display device (DP1 to DP4). Herein, the offset information being inputted by the user may include at least one of the structural position information of each display device (DP1 to DP4), the size information of the inputted video data (RGB), the total size information of the multi-panel display device, the size information of each individual display device (DP1 to DP4), and the alignment position information of the display devices (DP1 to DP4). The structure and operation of the data converter (DCM_1) will be described in more detail later on with reference to the corresponding drawings.

The plurality of display devices (DP1 to DP4) configuring the image display unit is not only limited to 2×2, as shown in FIG. 1, and may be formed in other formations of different sizes and shapes, such as 1×2, 2×1, 3×3, 4×4, 4×5, n×m (wherein m and n are integers being equal to or different from one another and wherein m≤0 and n≤0). The plurality of display devices (DP1 to DP4) included in the image display unit is connected to one another either in parallel or in series, or in a combination of parallel/serial connection, regardless of the alignment formation, thereby being simultaneously provided with the video data (SC_Data1 to SC_Data4), which are divided and scale-converted by the data converter (DCM_1) and the synchronization signals (DCLK, Hsync, Vsync, and DE). The above-described multi-panel display device according to the present invention is capable of representing a single image by using only the data converter (DCM_1), without requiring a video data distributor, a scaler, or a conversion board, which are used in the related art, for each display device (DP1 to DP4). As described above, in the multi-panel display device according to the present invention, which represents a single image, liquid crystal display (LCD) devices, field emission display (FED) devices, plasma display panel (PDP) devices, or light emitting display (LED) devices may be used as the plurality of display devices (DP1 to DP4).

Figure 2:
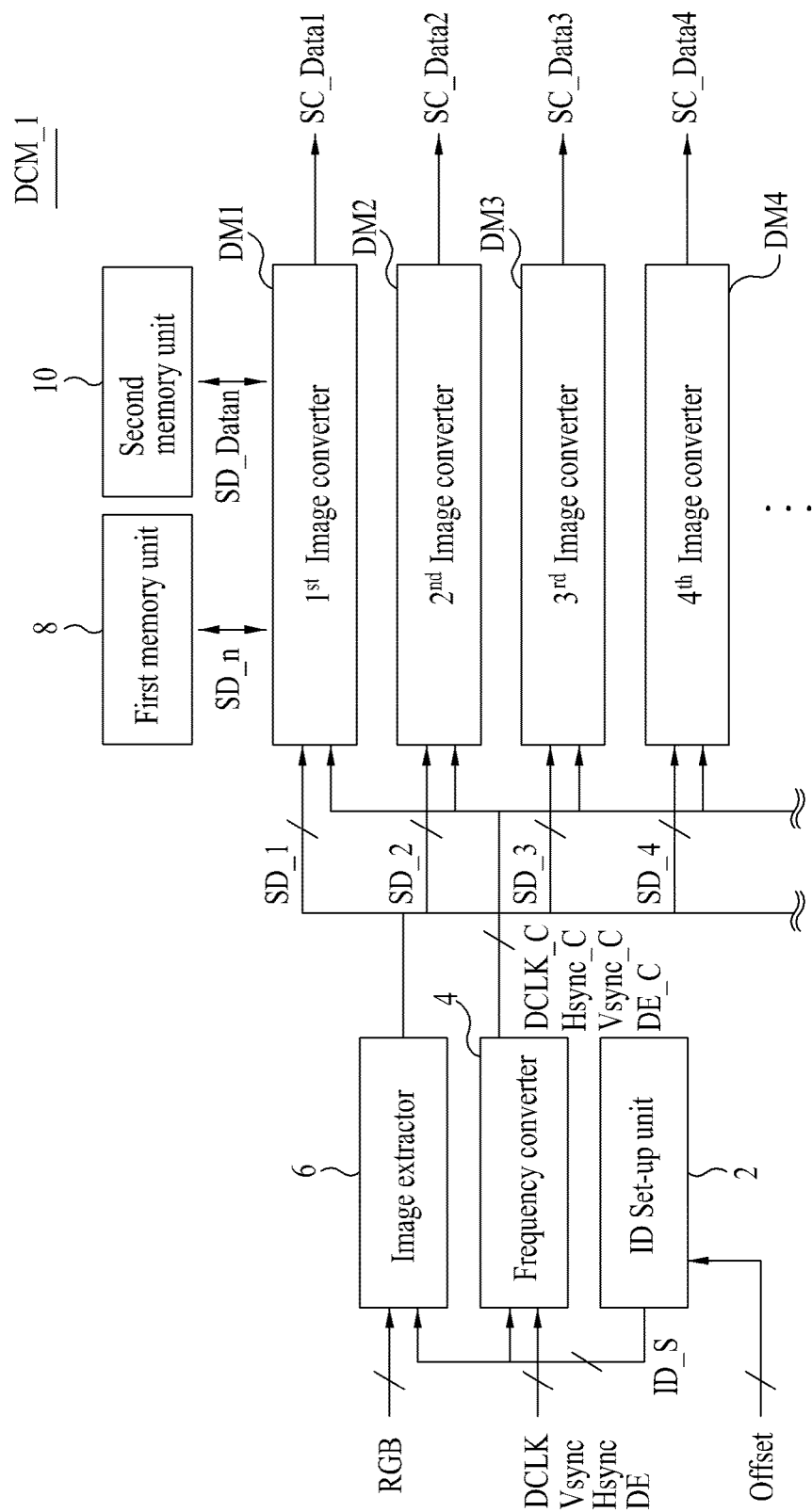
FIG. 2 illustrates a detailed block view showing the structure of a data converter shown in FIG. 1.

FIG. 2 illustrates a detailed block view showing the structure of a data converter shown in FIG. 1. Referring to FIG. 2, the data converter (DCM_1) includes an ID set-up unit 2, a frequency converter 4, an image extractor 6, and a plurality of image converters (DM_1 to DM_4). Herein, the ID set-up unit 2 internally sets up an ID signal (ID_S) based upon the offset information inputted by the user, and then stores and outputs the set up ID signal (ID_S). The frequency converter 4 performs expansion-conversion or reduction-conversion on the signal frequency of at least one of the synchronization signals (DCLK, Hsync, Vsync, and DE), thereby generating converted synchronization signals (DCLK_C, Hsync_C, Vsync_C, and DE_C). The image extractor 6 detects and divides the video data (RGB) with respect to the ID signal (ID_S), thereby generating and outputting a plurality of divided video data (SD_1 to SD_4). The plurality of image converters (DM_1 to DM_4) expands or reduces the size of each divided video data (SD_1 to SD_4), so as to convert the divided video data (SD_1 to SD_4), by using the converted synchronization signals (DCLK_C, Hsync_C, Vsync_C, and DE_C). Herein, the data converter (DCM_1) may further include a first memory unit 8 and a second memory unit 10. The first memory unit 8 stores and outputs each of the divided video data (SD_1 to SD_4) in units of at least one frame. The second memory unit 10 stores and outputs each of the expansion-converted or reduction-converted video data (SC_Data1 to SC_Data4) in units of at least one frame.

The ID set-up unit 2 receives the offset information (i.e., the structural position and size information of each display device (DP1 to DP4)) from the user. In other words, when a plurality of display devices (DP1 to DP4) are aligned, the user stores in advance (or pre-programs) the structural position information, the size information, and the overall alignment information of the display devices (DP1 to DP4). Herein, the user may input and set up the setoff information by using a remote controller or a dip switch. As described above, when the setoff information is inputted by the user, the ID set-up unit 2 sets up a unique ID signal (ID_S), thereby storing and outputting the set up ID signal (ID_S). At this point, the ID set-up unit 2 provides the set up ID signal (ID_S) to the image extractor 6 and the frequency converter 4.

Figure 3:
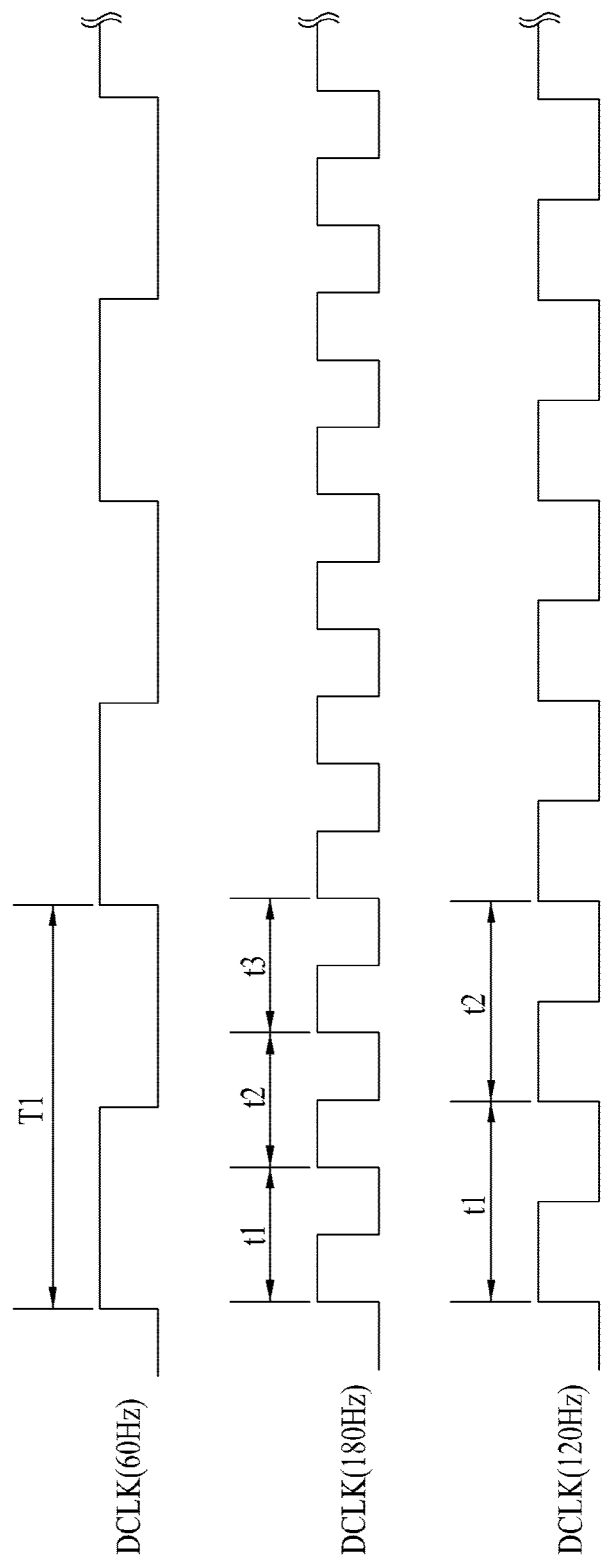
FIG. 3 illustrates a flow chart of a frequency expansion/conversion process of a dot clock among a plurality of synchronization signals.

The frequency converter 4 converts the signal frequency of at least one of the synchronization signals (DCLK, Hsync, Vsync, and DE) by expanding or reducing the signal frequency based upon the corresponding ID signal (ID_S), thereby generating converted synchronization signals (DCLK_C, Hsync_C, Vsync_C, and DE_C). More specifically, as shown in FIG. 3, the frequency converter 4 may perform expansion-conversion or reduction-conversion on the frequency of at least one of the synchronization signals (DCLK, Hsync, Vsync, and DE), such as the frequency of the dot clock (DCLK) In other words, when a dot clock (DCLK) is inputted at a frequency of 60 Hz, the frequency converter 4 expands and converts the cycle period of the dot clock (DCLK), so that the dot clock (DCLK) can have a frequency of 120 Hz or 180 Hz. Conversely, the frequency of the inputted signal may be reduced and converted.

When the frequency is expanded and converted to 3 times the inputted frequency (i.e., when the inputted frequency is tripled), one frequency cycle period (T1) of 60 Hz is expanded to first to third frequency cycle periods (t1 to t3) during the same time period, thereby converting the frequency to 180 Hz. Alternatively, when the driving frequency of 60 Hz is expanded and converted to 2 times the inputted driving frequency (i.e., when the inputted frequency is doubled), one frequency cycle period (T1) of 60 Hz is expanded to first and second frequency cycle periods (t1 and t2) during the same time period, thereby converting the frequency to 120 Hz.

In addition to the dot clock (DCLK), the frequency converter 4 can also expansion-convert or reduction-convert the frequency of the horizontal synchronization signal (Hsync) and the vertical synchronization signal (Vsync), as shown in FIG. 3. Since the converted synchronization signals (DCLK_C, Hsync_C, Vsync_C, and DE_C) are used for converting the size of each divided video data (SD_1 to SD_4), the converted synchronization signals (DCLK_C, Hsync_C, Vsync_C, and DE_C) are provided to the respective image converter (DM1 to DM4). Additionally, the frequency converter 4 may also simultaneously provide the externally inputted synchronization signals (DCLK, Hsync, Vsync, and DE) to each of the display devices (DP1 to DP4).

Figure 4:
FIG. 4 illustrates an example of a display image represented as a single image of the multi-panel display device configured in a 2×2 formation according to the present invention.
Figure 5:
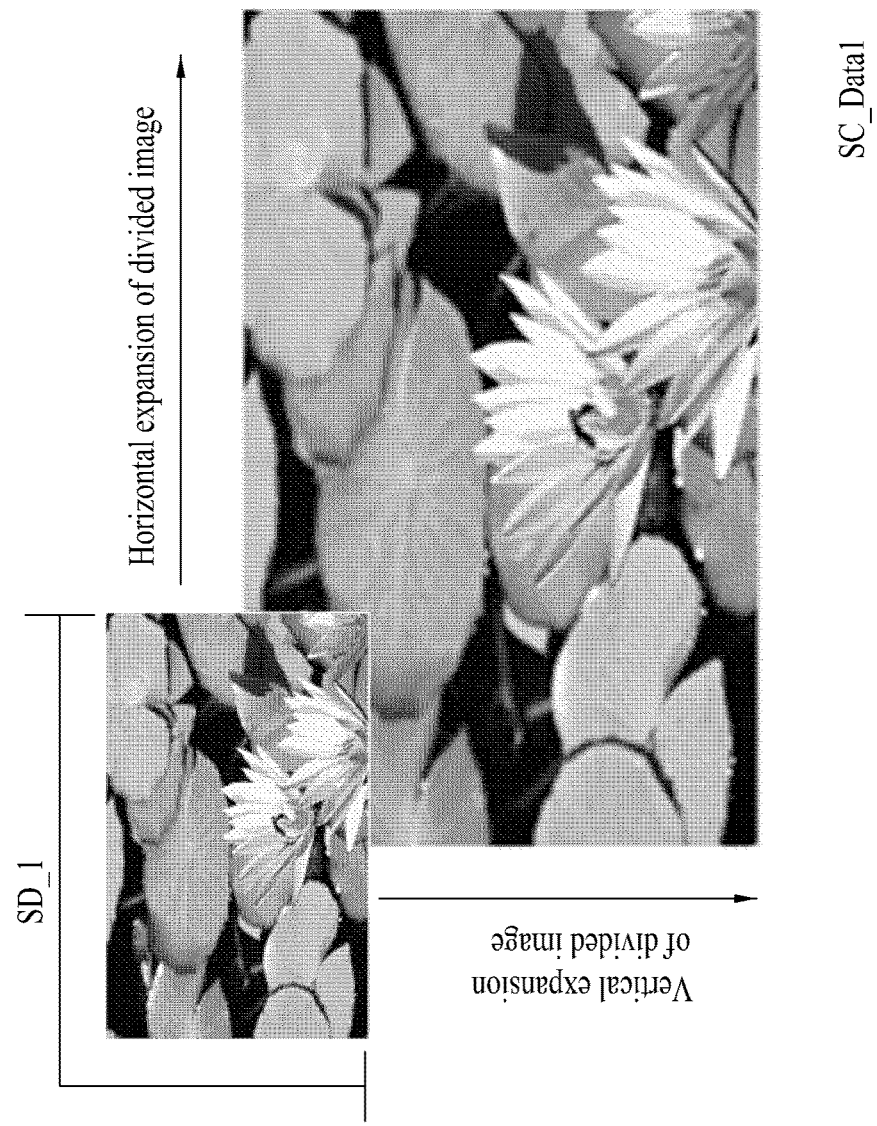
FIG. 5 illustrates an exemplary image for describing an image divided from the display image of FIG. 4 and for describing an expansion/conversion method of the divided image.

FIG. 4 illustrates an example of a display image represented as a single image of the multi-panel display device configured in a 2×2 formation according to the present invention. And, FIG. 5 illustrates an exemplary image for describing an image divided from the display image of FIG. 4 and for describing an expansion/conversion method of the divided image. Referring to FIG. 4 and FIG. 5, the image extractor 6 detects the video data (RGB) with respect to the ID signal (ID_S) provided from the ID set-up unit 2, thereby extracting divided video data portions (SD_1 to SD_4) corresponding to each image region ($1^{st}$ region to $4^{th}$ region). More specifically, in order to represent a whole image (i.e., a single image), as shown in FIG. 4, the image extractor 6 detects and divides the video data (RGB), which are inputted from an external source, for each region ($1^{st}$ region to $4^{th}$ region) in accordance with the ID signal (ID_S), thereby generating divided video data portions (SD_1 to SD_4). Thereafter, the image extractor 6 provides each of the divided video data portions (SD_1 to SD_4) to the respective image converters (DM_1 to DM_4).

Each of the plurality of image converters (DM_1 to DM_4) sequentially stores the inputted video data portions (SD_1 to SD_4) to the first memory unit 8. Then, each of the stored video data portions (SD_1 to SD_4) is read and outputted, based upon the converted synchronization signals (DCLK_C, Hsync_C, Vsync_C, and DE_C), so as to perform expansion-conversion or reduction-conversion in both horizontal and vertical directions on the read video data portions (SD_1 to SD_4), thereby generating converted video data portions (SC_Data1 to SC_Data4). Then, each of the generated converted video data portions (SC_Data1 to SC_Data4) is sequentially stored in the second memory unit 10, thereby being provided to the respective display device (DP1 to DP4).

For example, in case of the first image converter (DM1), as shown in FIG. 5, the vertical and horizontal sizes of the first divided video data (SD_1) are expanded in accordance with the frequency expansion rate of the converted synchronization signals (DCLK_C, Hsync_C, Vsync_C, and DE_C). In other words, when the frequency of each converted synchronization signal (DCLK_C, Hsync_C, Vsync_C, and DE_C) is expanded from 60 Hz to 120 Hz, the size of the first divided video data (SD_1) is expanded (or enlarged) to 2 times its original size in correspondence with the frequency expansion rate of each converted synchronization signal (DCLK_C, Hsync_C, Vsync_C, and DE_C), as shown in FIG. 5. At this point, the expansion of the first divided video data (SD_1) can be performed by equally extracting pixel unit data of the first divided video data (SD_1), which are being sequentially outputted from the first memory unit 8, in both horizontal and vertical directions in accordance with the frequency-converted synchronization signals (DCLK_C, Hsync_C, Vsync_C, and DE_C).

Meanwhile, although it is not shown, the multi-panel display device according to the present invention may be configured in a 3×3 formation. Each of the plurality of image converters (e.g., $1^{st}$ to $9^{th}$ image converters (not shown)) sequentially stores the inputted $1^{st}$ to $9^{th}$ divided video data portions to the first memory unit 8. Then, the size (e.g., resolution) of each stored divided video data portion is expanded or reduced in both horizontal and vertical directions in accordance with the frequency expansion rate of the converted synchronization signals (DCLK_C, Hsync_C, Vsync_C, and DE_C).

For example, when the frequency of each converted synchronization signal (DCLK_C, Hsync_C, Vsync_C, and DE_C) is expanded from 60 Hz to 180 Hz, each of the $1^{st}$ to $9^{th}$ divided video data portions is expanded (or enlarged) to 3 times its original size in correspondence with the frequency expansion rate of each converted synchronization signal (DCLK_C, Hsync_C, Vsync_C, and DE_C). Similarly, the expansion or reduction of each divided video data portion may be performed by equally extracting pixel unit data of the corresponding divided video data portions, which are being sequentially outputted from the first memory unit 8, in both horizontal and vertical directions in accordance with the frequency-converted synchronization signals (DCLK_C, Hsync_C, Vsync_C, and DE_C). As described above, the vertically and horizontally converted divided video data portions are sequentially stored in the second memory unit 10, thereby being sequentially provided to the respective display device.

Figure 6:
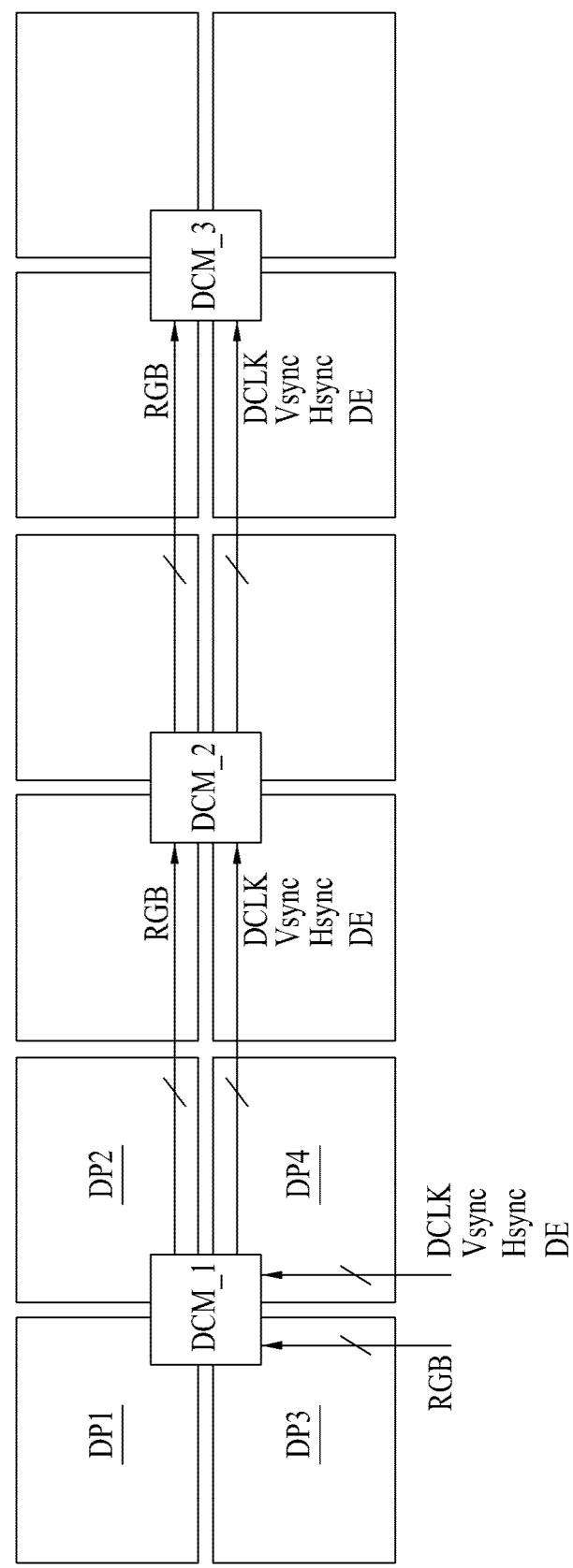
FIG. 6 illustrates a block view showing the structure of a second multi-panel display device according to an embodiment of the present invention.

FIG. 6 illustrates a block view showing the structure of a second multi-panel display device according to an embodiment of the present invention. As shown in FIG. 6, the multi-panel display device according to the present invention includes at least one image display unit and at least one data converter. More specifically, the at least one image display unit is configured of a plurality of flat panel display devices (DP1 to DP4) aligned in a 2×2 formation or in a larger formation. The at least one data converter (DCM_1 to DCM_3) is configured to correspond to each image display unit, so as to divide the externally inputted video data (RGB) in accordance with the offset information inputted by the user and to convert the size of the divided video data portions, thereby providing the converted video data portions to each of the flat panel display devices (DP1 to DP4).

Each of the image display units configured of a plurality of flat panel display devices, such as $1^{st}$ to $4^{th}$ display devices (DP1 to DP4), may be aligned in a 1×3 formation, as shown in FIG. 6. At this point, each of the data converters (DCM_1 to DCM_3) corresponds to an image display unit. Herein, the data converters (DCM_1 to DCM_3) are connected to one another either in parallel or in series, or in a combination of parallel/serial connection, so as to be simultaneously provided with the video data (RGB) and the synchronization signals (DCLK, Hsync, Vsync, and DE) from an external source. Each of the $1^{st}$ to $3^{rd}$ data converters (DCM_1 to DCM_3) divides the video data (RGB) received from an external source in accordance with the offset information, which is inputted by the user. Then, each of the $1^{st}$ to $3^{rd}$ data converters (DCM_1 to DCM_3) converts the size of the divided video data (SD_1 to SD_3), thereby providing the converted video data portions to the respective flat panel display devices (DP1 to DP4), which are connected to the image display unit. The detailed structure and operation of the $1^{st}$ to $3^{rd}$ data converters (DCM_1 to DCM_3) are identical to those of the data converter (DCM_1) described above with reference to FIG. 1 to FIG. 5. Therefore, detailed description of the same will be omitted for simplicity.

Figure 7:
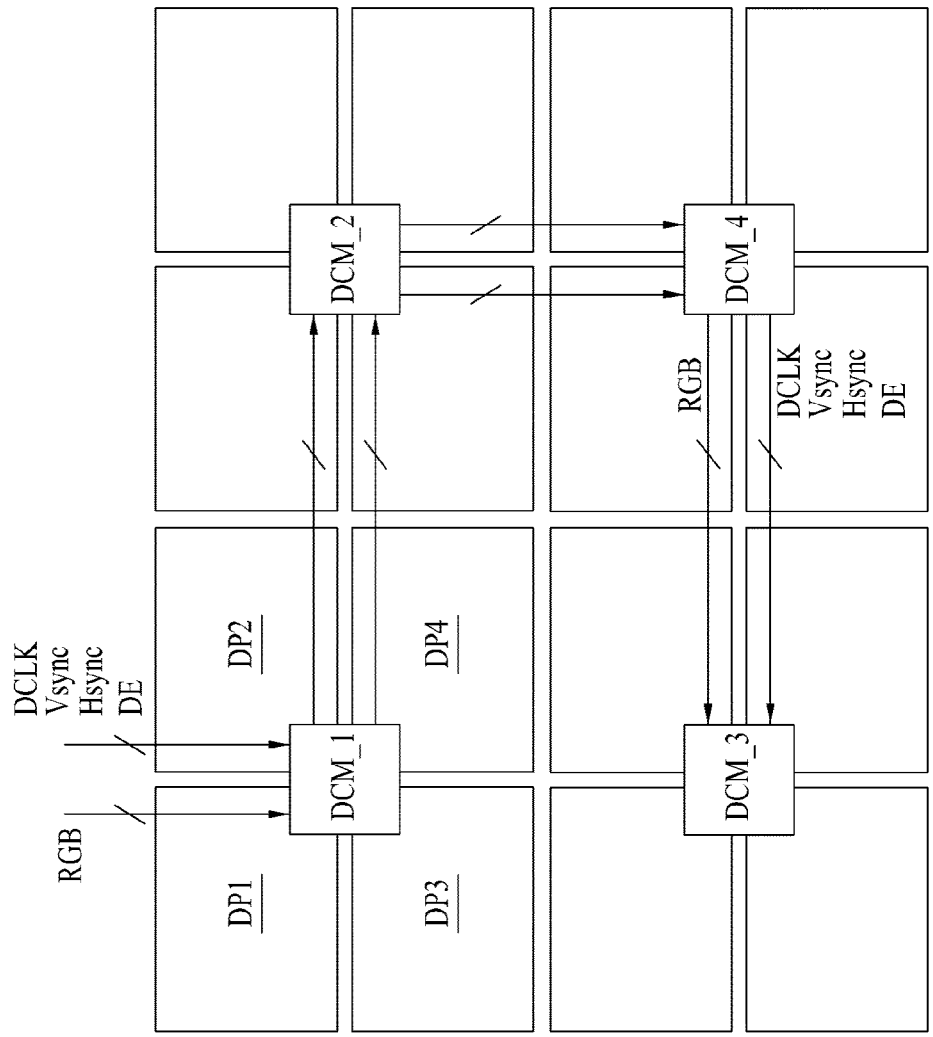
FIG. 7 illustrates a block view showing the structure of a third multi-panel display device according to an embodiment of the present invention.

FIG. 7 illustrates a block view showing the structure of a third multi-panel display device according to the present invention. As shown in FIG. 7, the multi-panel display device according to the present invention includes a plurality of image display units and $1^{st}$ to $4^{th}$ data converters (DCM_1 to DCM_4). More specifically, the plurality of image display units is configured of a plurality of flat panel display devices (DP1 to DP4) aligned in a 2×2 formation. Herein, the image display units are also aligned in a 2×2 formation. The $1^{st}$ to $4^{th}$ data converters (DCM_1 to DCM_4) are each configured to correspond to each image display unit. At this point, each of the $1^{st}$ to $4^{th}$ data converters (DCM_1 to DCM_4) divides the externally inputted video data (RGB) in accordance with the offset information inputted by the user and converts the size of the divided video data portions, thereby providing the converted video data portions to each of the image display units.

More specifically, the image display units configured of a plurality of flat panel display devices (DP1 to DP4), which are aligned in a 2×2 formation, may also be aligned in a 2×2 formation, as shown in FIG. 7. Furthermore, each of the $1^{st}$ to $4^{th}$ data converters (DCM_1 to DCM_4) is configured to correspond to each image display unit. Herein, the data converters (DCM_1 to DCM_4) are connected to one another either in parallel or in series, or in a combination of parallel/serial connection, so as to be simultaneously provided with the video data (RGB) and the synchronization signals (DCLK, Hsync, Vsync, and DE) from an external source. Each of the $1^{st}$ to $4^{th}$ data converters (DCM_1 to DCM_4) divides the video data (RGB) received from an external source in accordance with the offset information, which is inputted by the user. Then, each of the $1^{st}$ to $4^{th}$ data converters (DCM_1 to DCM_4) converts the size of the divided video data (SD_1 to SD_4), thereby providing the converted video data portions to the respective flat panel display devices (DP1 to DP4), which are connected to the respective image display unit. The detailed structure and operation of the $1^{st}$ to $4^{th}$ data converters (DCM_1 to DCM_4) are identical to those of the data converter (DCM_1) described above with reference to FIG. 1 to FIG. 5. Therefore, detailed description of the same will be omitted for simplicity.

Figure 8:
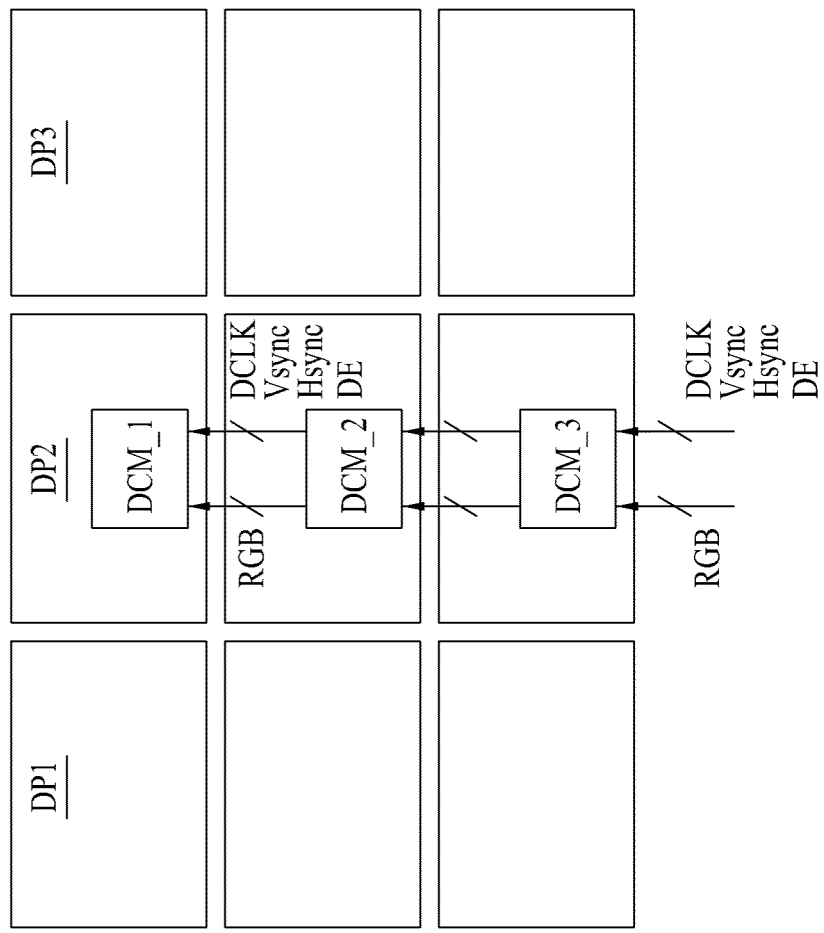
FIG. 8 illustrates a block view showing the structure of a fourth multi-panel display device according to an embodiment of the present invention.

FIG. 8 illustrates a block view showing the structure of a fourth multi-panel display device according to the present invention. As shown in FIG. 8, the multi-panel display device according to the present invention includes a plurality of image display units and $1^{st}$ to $3^{rd}$ data converters (DCM_1 to DCM_3). More specifically, the plurality of image display units is configured of a plurality of flat panel display devices (DP1 to DP3) aligned in a 1×3 formation. Herein, the image display units are also aligned in a 3×1 formation. The $1^{st}$ to $3^{rd}$ data converters (DCM_1 to DCM_3) are each configured to correspond to each image display unit. At this point, each of the $1^{st}$ to $3^{rd}$ data converters (DCM_1 to DCM_3) divides the externally inputted video data (RGB) in accordance with the offset information inputted by the user and converts the size of the divided video data portions, thereby providing the converted video data portions to each of the image display units.

More specifically, the image display units configured of a plurality of flat panel display devices (DP1 to DP3), which are aligned in a 1×3 formation, may also be aligned in a 3×1 formation, as shown in FIG. 8. Furthermore, each of the $1^{st}$ to $3^{rd}$ data converters (DCM_1 to DCM_3) is configured to correspond to each image display unit. Herein, the data converters (DCM_1 to DCM_3) are connected to one another either in parallel or in series, or in a combination of parallel/serial connection, so as to be simultaneously provided with the video data (RGB) and the synchronization signals (DCLK, Hsync, Vsync, and DE) from an external source. Each of the $1^{st}$ to $3^{rd}$ data converters (DCM_1 to DCM_3) divides the video data (RGB) received from an external source in accordance with the offset information, which is inputted by the user. Then, each of the $1^{st}$ to $3^{rd}$ data converters (DCM_1 to DCM_3) converts the size of the divided video data (SD_1 to SD_3), thereby providing the converted video data portions to the respective flat panel display devices (DP1 to DP3), which are connected to the respective image display unit. The detailed structure and operation of the $1^{st}$ to $3^{rd}$ data converters (DCM_1 to DCM_3) are identical to those of the data converter (DCM_1) described above with reference to FIG. 1 to FIG. 5. Therefore, detailed description of the same will be omitted for simplicity.

Figure 9:
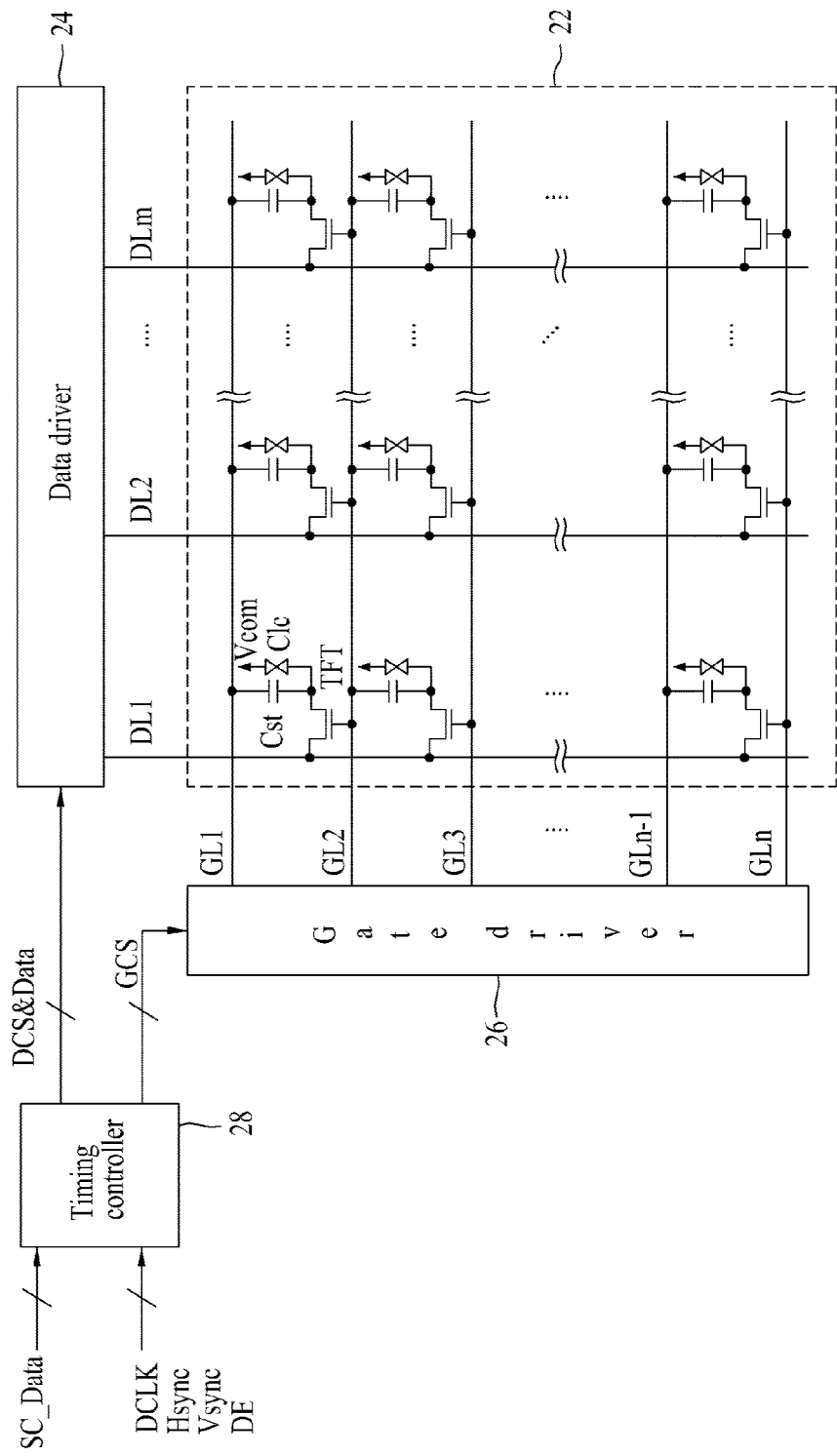
FIG. 9 illustrates a detailed block view showing the structure of one of the plurality of multiple display devices shown in FIG. 1, and FIG. 6 to FIG. 8.

FIG. 9 illustrates a detailed block view showing the structure of one of the plurality of multiple display devices shown in FIG. 1, and FIG. 6 to FIG. 8. Any one of the liquid crystal display device, the field emission display device, the plasma display panel device, and the light emitting display device may be used as the plurality of display devices shown in FIG. 1, and FIG. 6 to FIG. 8. Hereinafter, an example of using liquid crystal display device as any one of the multiple display devices will be proposed in the description of the present invention.

The liquid crystal display device shown in FIG. 9 includes a liquid crystal display panel 22, a data driver 24, a gate driver 26, and a timing controller 28. Herein, the liquid crystal display panel 22 is configured of a plurality of pixel regions. The data driver 24 drives a plurality of data lines (DL1 to DLm), and the gate driver 26 drives a plurality of gate lines (GL1 to GLn). And, the timing controller 28 aligns the converted video data (SC_Data1) received from the data converter (DCM_1), so as to provide the aligned converted video data (SC_Data1) to the data driver 24. Also, the timing controller 28 generates gate and data control signals (GCS and DCS) based upon the synchronization signals (DCLK, Hsync, Vsync, and DE), thereby controlling the operation (or driving) timing of the gate and data drivers (26 and 24).

The liquid crystal display panel 22 is provided with a thin film transistor (TFT) formed in each pixel region, which is defined by the plurality of data lines (DL1 to DLm) and the plurality of gate lines (GL1 to GLn), and a liquid crystal capacitor (Clc) connected to the thin film transistor (TFT). The liquid crystal capacitor (Clc) includes a pixel electrode, which is connected to the TFT, and a common electrode facing the pixel electrode. Herein, the liquid crystals are placed between the pixel electrode and the common electrode. The TFT responds to a scan pulse received from each of the gate lines (GL1 to GLn), so as to provide a video signal received from each of the data lines (DL1 to DLm) to the pixel electrode.

The liquid crystal capacitor (Clc) charges a difference in voltage between the video signal provided to the pixel electrode and the common voltage provided to the common electrode, and then varies the alignment of the liquid crystal molecules based upon the difference in voltage, so as to adjust the light transmissivity, thereby realizing the gradation (or gray level) of a displayed image. Furthermore, a storage capacitor (Cst) is connected in parallel to the liquid crystal capacitor (Clc), so that the voltage charged to the liquid crystal capacitor (Clc) can be maintained until a next data signal is provided. The storage capacitor (Cst) is formed by having the pixel electrode overlap with a previous gate line. Herein, an isolation layer is provided between the pixel electrode and the previous gate line. Conversely, the storage capacitor (Cst) may also be formed by having the pixel electrode overlap with a storage line. Herein, an isolation layer is provided between the pixel electrode and the storage line.

Just as the timing controllers configured in other liquid crystal display devices, the timing controller 28 of the multi-panel display device according to the present invention simultaneously receives video data (RGB) and synchronization signals (DCLK, Hsync, Vsync, and DE) from an external source. The timing controller 28 aligns the converted video data (SC_Data1) provided by the data converter (DCM_1), so as to be adequate (or suitable) for the operation (or driving) of the liquid crystal panel 22. Thereafter, the aligned converted video data (SC_Data1) are provided to the data driver 24. Also, the timing controller 28 uses at least one of the synchronization signals (DCLK, Hsync, Vsync, and DE) (i.e., the dot clock (DCLK), the data enable signal (DE), the horizontal synchronization signal (Hsync), and the vertical synchronization signal (Vsync)), so as to generate gate and data control signals (GCS and DCS). Then, the timing controller 28 respectively provides the generated gate and data control signals (GCS and DCS) to the gate driver 26 and the data driver 24, thereby controlling the gate driver 26 and the data driver 24.

The data driver 24 uses a data control signal (DCS), e.g., a source start pulse (SSP), a source shift clock (SSC), a source output enable (SOE) signal, received from the timing controller 28 so as to convert the data aligned by the timing controller 28 to an analog voltage (i.e., a video signal). More specifically, based upon the SSC, the data driver 24 latches the data, which have been gamma-converted and aligned by the timing controller 28. Then, the data driver 24 responds to the SOE signal, thereby providing each data line (DL1 to DLm) with a portion of the video signal corresponding to one horizontal line for each horizontal period, during which a scan pulse is provided. At this point, based upon the gray-level value of the aligned data, the data driver 24 selects a gamma voltage having a predetermined level of a positive or negative polarity. Then, the data driver 24 provides each data line (DL1 to DLm) with the selected gamma voltage via the image signal.

The gate driver 26 responds to a gate control signal (GCS), e.g., a gate start pulse (GSP), a gate shift clock (GSC), a gate output enable (GOE) signal, received from the timing controller 28 so as to sequentially generate scan pulses, thereby respectively providing the generated scan pulses to each of the gate lines (GL1 to GLn). In other words, the gate driver 26 shifts the GSP received from the timing controller 28 in accordance with the GSC, thereby sequentially providing a scan pulse (e.g., a gate-on voltage) to the gate lines (GL1 to GLn). Furthermore, a gate-off voltage is provided during the period when the gate-on voltage is not provided to the gate lines (GL1 to GLn) Herein, the gate driver 26 performs controls the pulse width of the scan pulses in accordance with the GOE signal.

As described above, the multi-panel display device and the method of driving the same according to the present invention have the following advantages. Unlike the related art multi-panel display device, the present invention can divide and expansion-convert an image by using a minimum number of data converters (DCM_1), without requiring a separate video data distributor, scaler, or conversion board for each display device. Accordingly, by simplifying the driving circuit for driving the multi-panel, the present invention can reduce the fabrication cost and enhance productivity. Furthermore, by reducing the transmission paths of data for displaying the corresponding image and by configuring identical data transmission paths, the present invention may be able to reduce the effects caused by noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. In a multi-panel display device configured to align multiple flat panel display devices for representing a single image, the multi-panel display device comprises:
at least one image display unit configured to align the multiple flat panel display devices aligned in an n×m formation (wherein m and n are integers being equal to or different from one another, and wherein m≥1, n≥1);
at least one data converter being configured to correspond to each image display unit, dividing externally inputted video data in accordance with offset information inputted and stored by a user, and converting the size of the divided video data, thereby providing the converted divided video data to each flat panel display device, wherein the offset information includes structural position information of each display device, a total size information of the multi-panel display device, size information of each individual display device, and alignment position information of the display devices,
wherein each data converter comprises an ID set-up unit internally setting up an ID signal based upon the offset information inputted by the user, thereby storing and outputting the set-up ID signal;
a frequency converter performing expansion-conversion or reduction-conversion on a signal frequency of at least one synchronization signal inputted from an external source, thereby generating a frequency-converted synchronization signal;
an image extractor detecting and dividing the video data with respect to the ID signal, thereby generating and outputting a plurality of divided video data; and
a plurality of image converters expanding or reducing the size of the divided video data using the frequency-converted synchronization signal, thereby providing the size-converted divided video data to each of the flat panel display devices,
wherein in the plurality of image converters each of the video data portions is read and outputted, based upon the converted synchronization signals, so as to perform expansion-conversion or reduction-conversion in both horizontal and vertical directions on the read video data portions, thereby generating converted video data portions,
wherein the ID set-up unit sets up a unique ID signal based upon at least one of the offset information including structural position information of each display device, the size information of the inputted video data, the total size information of the multi-panel display device, the size information of each individual display device, and the alignment position information of the display devices, thereby storing and outputting the set-up ID signal, and
wherein the image extractor detects the video data, which are inputted from an external source, for each region in accordance with the offset information including the structural position information of each display device, the total size information of the multi-panel display device, the size information of each individual display device, and the alignment position information of the display devices, thereby generating divided video data portions.

2. The multi-panel display device of claim 1, wherein each image converter equally extracts pixel unit data of the divided video data, the divided video data being sequentially outputted from the first memory unit, in both horizontal and vertical directions in accordance with the frequency-converted synchronization signal.

3. The multi-panel display device of claim 1, wherein the at least one image display unit is aligned in at least one of 1×2, 2×1, 2×2, and n×m formations (wherein m and n are integers being equal to or different from one another, and wherein m≥1, n≥1), and
wherein, regardless of the alignment formation, each of the data converters, being formed to be in correspondence with each image display unit, is connected to one another either in parallel or in series, or in a combination of parallel/serial connection, so as to be simultaneously provided with the video data and the synchronization signals.

4. The multi-panel display device of claim 1, wherein the offset information corresponds to at least one of structural position information of each flat panel display device, size information of the inputted video data, total size information of the multi-panel display device, size information of each individual flat panel display device, and alignment position information of the flat panel display devices.

5. In a method of driving a multi-panel display device configured to align of multiple flat panel display devices for representing a single image, the method of driving the multi-panel display device comprises:

aligning at least one image display unit configured to align the multiple flat panel display devices aligned in an n×m formation (wherein m and n are integers being equal to or different from one another, and wherein m≥1, n≥1);

configuring at least one data converter so as to be in correspondence with each image display unit; and dividing externally inputted video data in accordance with offset information inputted and stored by a user using the at least one data converter, and converting the size of the divided video data, thereby providing the converted video data to each flat panel display device, wherein the offset information includes structural position information of each display device, a total size information of the multi-panel display device, size information of each individual display device, and alignment position information of the display devices, wherein the converting the size of the divided video data comprises internally setting up an ID signal based upon the offset information inputted by the user, thereby storing and outputting the set-up ID signal;

performing expansion-conversion or reduction-conversion on a signal frequency of at least one synchronization signal inputted from an external source, thereby generating a frequency-converted synchronization signal;

detecting and dividing the video data with respect to the ID signal, thereby generating a plurality of divided video data; and expanding or reducing the size of the divided video data using the frequency-converted synchronization signal, thereby providing the size-converted divided video data to each of the flat panel display devices, wherein, in the converting the size of the divided video data, each of the video data portions is read and outputted, based upon the converted synchronization signals, so as to perform expansion-conversion or reduction-conversion in both horizontal and vertical directions on the read video data portions, thereby generating converted video data portions, wherein setting up the ID comprises sets up a unique ID signal based upon at least one of the offset information including the structural position information of each display device, the size information of the inputted video data, the total size information of the multi-panel display device, the size information of each individual display device, and the alignment position information of the display devices, thereby storing and outputting the set-up ID signal, and wherein detecting the video data, which are inputted from an external source, for each region in accordance with the offset information including the structural position information of each display device, the total size information of the multi-panel display device, the size information of each individual display device, and the alignment position information of the display devices, thereby generating divided video data portions.

* * * * *